(12) United States Patent
Wang

(10) Patent No.: US 8,640,952 B2
(45) Date of Patent: Feb. 4, 2014

(54) MOBILE CODE DECODING FAULT RECOVERY VIA HISTORY DATA ANALYSIS

(75) Inventor: Shu Wang, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/005,870

(22) Filed: Jan. 13, 2011

(65) Prior Publication Data

US 2012/0181336 A1 Jul. 19, 2012

(51) Int. Cl.
*G06K 5/00* (2006.01)
(52) U.S. Cl.
USPC ............................ 235/437; 235/375; 235/435
(58) Field of Classification Search
USPC ........ 235/437, 435, 375, 470, 462.12, 462.45
See application file for complete search history.

(56) References Cited

U.S. PATENT DOCUMENTS

| | | | |
|---|---|---|---|
| 2005/0218231 A1* | 10/2005 | Massieu | 235/472.01 |
| 2006/0255150 A1* | 11/2006 | Longacre | 235/462.45 |
| 2007/0242883 A1* | 10/2007 | Kruppa | 382/181 |
| 2008/0029602 A1* | 2/2008 | Burian et al. | 235/462.09 |
| 2009/0159658 A1* | 6/2009 | Cheung et al. | 235/375 |
| 2011/0068175 A1* | 3/2011 | Powers et al. | 235/462.25 |

* cited by examiner

*Primary Examiner* — Edwyn Labaze
(74) *Attorney, Agent, or Firm* — Jefferson IP Law, LLP

(57) ABSTRACT

An apparatus and method for mobile code decoding fault recovery are provided. The method includes scanning a mobile code, decoding the mobile code, when the mobile code is not decoded successfully, storing a decoded portion of the mobile code as a partially decoded mobile code, and decoding the mobile code based on a sequence alignment algorithm and a predetermined number of partially decoded mobile codes, and providing the decoded mobile code to the mobile device.

14 Claims, 5 Drawing Sheets

| 1st DECODING RESULT: | XX1122334455 |
|---|---|
| 2nd DECODING RESULT: | 0011223344XX |
| DECODING RESULTS VIA: | 001122334455 |

FIG. 1

MOBILE CODE DECODING FAULT RECOVERY VIA HISTORY DATA ANALYSIS

BACKGROUND OF THE INVENTION

1. Field of the Invention

The present invention relates to an apparatus and method for mobile code decoding. More particularly, the present invention relates to an apparatus and method for mobile code decoding fault recovery.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile codes are fast gaining traction as enablers for online content and services. Mobile codes storing addresses and URLs may appear in magazines, on signs, buses, business cards or just about any object that users might need information about. Users with a camera phone equipped with the correct reader software can scan the image of the mobile code causing the phone's browser to launch and redirect to the programmed URL. This act of linking from physical world objects is known as a hardlink or physical world hyperlinks. Users can also generate and print their own mobile codes for others to scan.

In order to ensure user friendliness, a mobile code (such as a 2D barcode) should be easy to decode. For this reason, mobile codes typically include an error correction scheme. If the mobile code is not scanned correctly, the error correction information can be used to reconstruct missing or erroneous data. Nevertheless, a failure to read a mobile code can still occur, even when error correction is employed. In this case, the data, including successfully decoded portions, is discarded and the user must scan the mobile code again. A user who needs to rescan a mobile code multiple times is likely to become frustrated and unwilling to use a mobile code in the future. Accordingly, a method for improving mobile code fault recovery is desired.

SUMMARY OF THE INVENTION

An aspect of the present invention is to address at least the above-mentioned problems and/or disadvantages and to provide at least the advantages described below. Accordingly, an aspect of the present invention is to provide an apparatus and method for mobile code decoding fault recovery via a history data analysis.

In accordance with an aspect of the present invention, a method for decoding a mobile code is provided. The method includes scanning a mobile code, decoding the mobile code, when the mobile code is not decoded successfully, storing a decoded portion of the mobile code as a partially decoded mobile code, and decoding the mobile code based on a sequence alignment algorithm and a predetermined number of partially decoded mobile codes, and providing the decoded mobile code to the mobile device.

In accordance with another aspect of the present invention, a mobile device is provided. The mobile device includes a mobile code scanner for scanning a mobile code, a mobile code decoder for decoding the mobile code, a storage unit for storing partially decoded mobile codes representing decoded portions of mobile codes that could not be fully decoded by the mobile code decoder, and a sequence alignment processor for decoding the mobile code based on the stored partially decoded mobile codes and a sequence alignment algorithm when the mobile code decoder could not decode the mobile code.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 shows an example of a mobile code history comparison according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figures 2A, 2B, 2C:
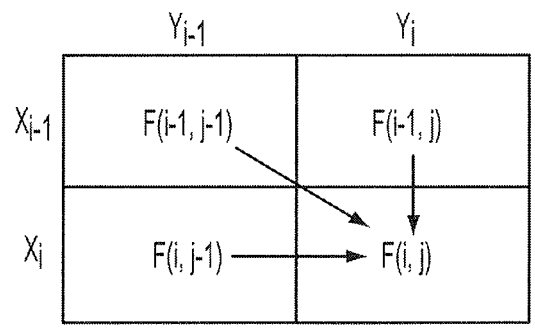
FIGS. 2A-2D are drawings explaining a Sequence Alignment Algorithm according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile device." However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile device" should not be used to limit application of the present inventive concepts to any certain type of apparatus or device.

Exemplary embodiments of the present invention include an apparatus and method for mobile code decoding fault recovery via a historical analysis.

FIG. 1 shows an example of a mobile code history comparison according to an exemplary embodiment of the present invention.

Referring to FIG. 1, a mobile code has been scanned twice, but could not be fully decoded due to missing characters. The first attempt was unsuccessful because the first two characters, represented as "XX", could not be scanned. Similarly, the second attempt was unsuccessful because the last two characters, also represented as "XX", could not be scanned. In each of these attempts, only a portion of the mobile code was successfully decoded. The first and second attempts can therefore be seen as generating two partially decoded mobile codes. Both of these partially decoded mobile codes include useful information about the complete mobile code. In a conventional system, however, these incomplete results are discarded and the user must re-scan the mobile code. Instead of discarding the partially decoded mobile codes and scanning the mobile code a third time, the first and second results can be combined to obtain a correct decoded result, as shown in FIG. 1.

Although the example shown in FIG. 1 includes two decoding results, a method according to an exemplary embodiment of the present invention can be extended to include a predetermined number of previously partially decoded mobile codes as a current partially decoded mobile code. This information can be analyzed via a historical data analysis algorithm to obtain a correct result without additional decoding attempts. This process can be seen as a kind of "collaborative decoding". Instead of decoding a mobile based on only one attempt, a series of attempts can be combined together to create a final result.

Sequence alignment algorithms are one such class of data analysis algorithms. Sequence alignment is typically used in the field of bioinformatics to arrange gene sequences (e.g., DNA, RNA, and proteins) in order to detect regions of similarity. In molecular biology, sequence alignment is used for a variety of purposes, including detecting mutations that may have occurred over the course of evolution or obtaining an evolutionary history of a particular sequence of proteins. These algorithms can also be useful in decoding mobile codes, as described below.

In sequence alignment, the strings to be aligned are assumed to come from a common ancestor. For a mobile code, the common ancestor would be the complete mobile code represented by a 2D barcode or other barcode. Each string may include missing or incorrect characters, such as the missing characters in the example shown in FIG. 1.

The algorithm takes in two or more sequences of mobile codes and a scoring scheme. Typically, an algorithm operating on two sequences is referred to as a Pairwise Sequence Algorithm (PSA), and an algorithm operating on more than two sequences is referred to as a Multiple Sequence Algorithm (MSA). The sequences may be previously stored unsuccessful decoding attempts and a current decoding attempt. The scoring scheme may be a matrix indicating how similar each given code is to another code. The more similar one code is to another, the higher the value of the corresponding entry in the similarity matrix.

FIGS. 2A-2D are drawings explaining a PSA according to an exemplary embodiment of the present invention.

Referring to FIG. 2A, a similarity matrix is shown between the codes A, C, G, and T. The diagonal entries of the matrix have the value 2, indicating that a match between codes has a similarity score of 2. The remaining entries have various negative values indicating the relative dissimilarity between the two codes. For example, 'C' and 'A' have a score of −7, indicating that they are more dissimilar than 'G' and 'A', which have a score of −5. The similarity matrix shown in FIG. 2A is merely exemplary; another similarity matrix could have values of 1 along the diagonal and 0 everywhere else, indicating that different codes are mismatches.

Referring to FIGS. 2B and 2C, a matrix F is created based on an assigned gap penalty and the similarity matrix. The gap penalty is a value which penalizes the amount and number of gaps in a sequence alignment. A large gap penalty may result in an alignment having a small number of gaps, while a low gap penalty may have the opposite effect.

The rules for generating the matrix F are shown in FIG. 2B. The columns of the matrix correspond to a sequence X, and the rows of the matrix correspond to a sequence Y. In the example shown in FIGS. 2B and 2C, the sequence X is 'AAG', and the sequence Y is 'AGC'. The upper-left field is assigned a value of 0. The top row and left column are assigned multiples of the gap penalty, according to Equation 1 below.

$$F(i,0) = -id$$

$$F(0,j) = -jd \quad \text{Equation 1}$$

In Equation 1, $F(i, j)$ represents a field of the matrix F, and d represents the gap penalty. In the example shown in FIG. 2B, the gap penalty is 5.

The remainder of the matrix F is filled in from the top left corner to the bottom right corner according to FIG. 2B and Equation 2 below:

$$F(i, j) = \max \begin{cases} F(i-1, j-1) + s(a_i, b_j) \\ F(i-1, j) - d \\ F(i, j-1) - d \end{cases} \quad \text{Equation 2}$$

In Equation 2, $s(a_i, b_j)$ denotes the corresponding entry in the similarity matrix shown in FIG. 2A. $F(i, j)$ represents a field of the matrix F, and d denotes the gap penalty. FIG. 2B graphically shows how the remaining fields are filled in according to Equation 2, and FIG. 2C shows the final result after applying Equation 2 to all the fields of the matrix F.

The particular choice made in Equation 2 corresponds to whether the alignment includes a gap. If $F(i-1, j)-d$ is chosen, this indicates that $X_i$ is aligned with a gap. Similarly, if $F(i, j-1)-d$ is chosen, this indicates that $Y_j$ is aligned with a gap, where $X_i$ and $Y_j$ refer to particular elements in the corresponding sequences X and Y. Finally, if F(i−1, j−1) is chosen, this indicates that $X_i$ and $Y_j$ are aligned together. While this might be expected to occur where the two elements match, mismatched elements could also be aligned together depending on the values of the gap penalty and the similarity score.

Figure 2D:
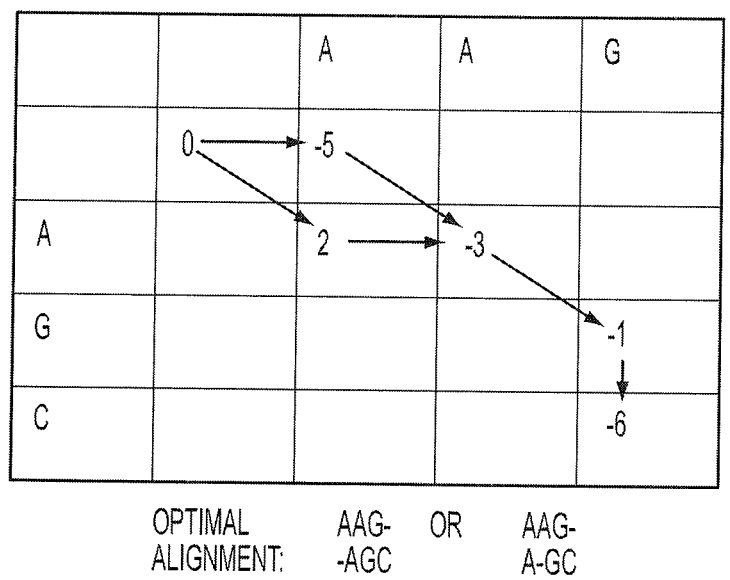

FIG. 2D shows a trace route through a matrix according to an exemplary embodiment of the present invention.

Referring to FIG. 2D, the optimal alignment is determined by tracing a route back through the matrix F, starting with the bottom right field. Starting from the bottom right field, a route back through the matrix is selected by returning to the field which generated the current field according to Equation 2. For example, the bottom right field is given the value −6, and was determined according to Equation 2 based on the three adjacent fields. The value for the bottom right field was generated according to the values of the fields (2, 2), (3, 2), and (3, 3) as follows:

$$F(3,3)=\max[(F(2,2)+s(G,A),F(2,3)-5,F(3,2)-5]$$

Substituting for F(2, 2), s(G, A), F(2, 3), and F(3, 2) yields the following:

$$F(3,3)=\max[-10,-6,-13]$$

From the above, the maximum value (−6) was determined according to the field F(2, 3). The field F(2, 3) has the value of −1, which when added to the gap penalty of −5 yields −6. Of the calculations based on the three neighboring fields, −6 yielded the highest result. Accordingly, the trace route proceeds to F(2, 3). A similar procedure is repeated until a route is traced from the bottom right corner to the top left corner. Where two results are equal, the route may be selected arbitrarily.

The resulting trace route corresponds to an optimal sequence alignment. Starting from the front (right) end of the alignment, a step to (i−1, j−1) maps to an alignment of ($X_i$, $Y_j$); a step up to (i−1, j) maps to an alignment of ($X_i$, −); and a step to the left (i, j−1) maps to an alignment of (−, $Y_j$). For example, with respect to the bottom right field, since the route steps up, the resulting sequence has a gap in the sequence X at the far right, and the code 'C' in the sequence Y, as seen in the optimal alignment shown in FIG. 2D.

The PSA algorithm described above with respect to FIGS. 2A-2C can be extended to operate on three or more sequences; however, the corresponding MSA grows exponentially with the number and length of the sequences. Accordingly, such an algorithm can only be used for a small number of potential sequences. For a mobile device, even small numbers of sequences may be beyond the space and processing power available to the mobile device.

Since an exponential growth in space and complexity is a problem even for devices far more powerful than the typical mobile device, a variety of heuristic algorithms have been proposed which are faster and more efficient. These heuristic algorithms employ pruning, progressive iteration of pairwise alignments, and other techniques to reduce the processing time and space of the MSA. Any of these heuristic algorithms can be employed according to an exemplary embodiment of the present invention, so long as the processing power and storage space required is within the capabilities of the particular mobile device in which the heuristic algorithm is to be used. An example of such a mobile device is described below with respect to FIG. 3.

Figure 3:
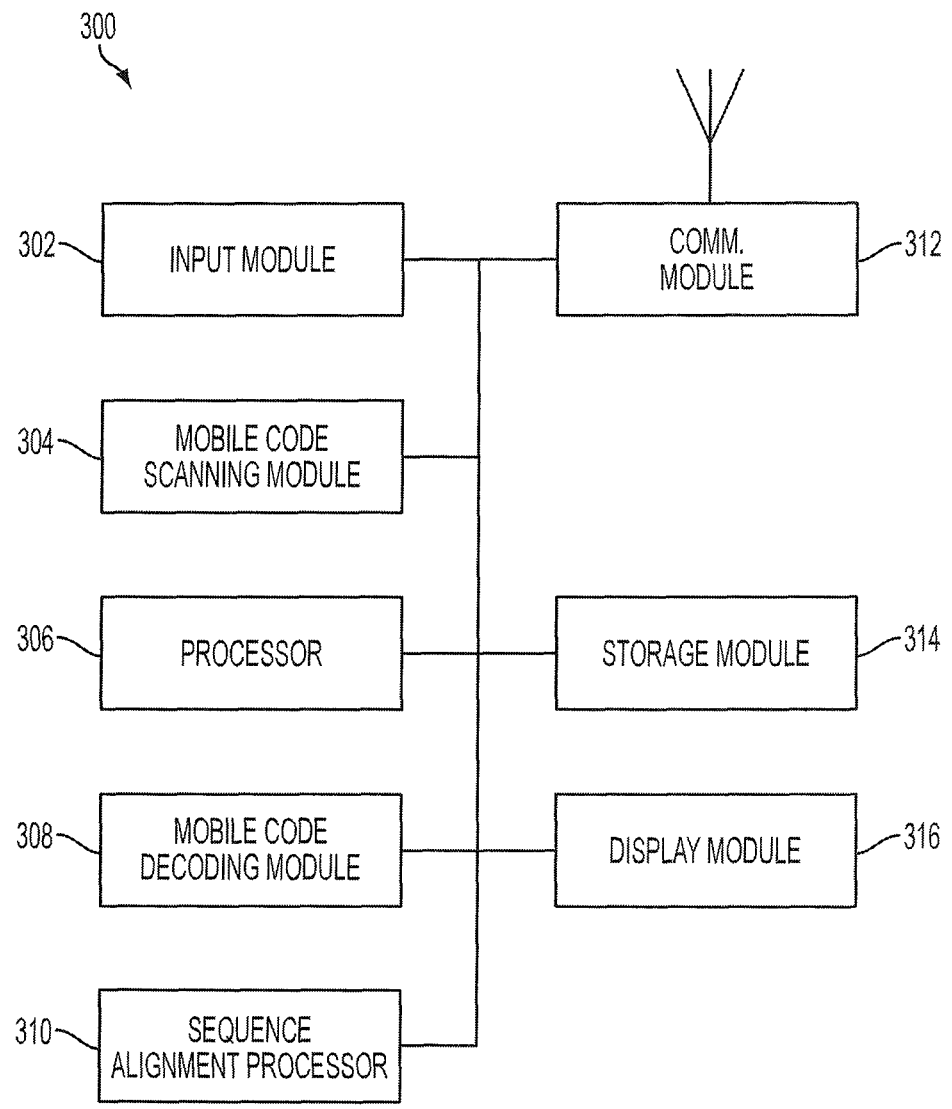
FIG. 3 illustrates a mobile device according to an exemplary embodiment of the present invention.

FIG. 3 illustrates a mobile device according to an exemplary embodiment of the present invention.

Referring to FIG. 3, the mobile device 300 includes an input module 302, a mobile code scanning module 304, a processor 306, a mobile code decoding module 308, a sequence alignment processor 310, a communication module 312, a storage module 314, and a display module 316. According to an exemplary embodiment of the present invention, the mobile device 300 may include additional and/or different modules. Similarly, the functionality of one or more of the above modules may be integrated into a single component. The mobile device 300 can also implement one or more location based or navigation services requiring access to location information.

The mobile device may be, for example, a mobile phone, smart phone, personal digital assistant, personal entertainment device, and the like. Similarly, an exemplary embodiment of the present invention may be applied to other user devices employing mobile codes, including, for example, desktop devices or other non-mobile devices. Accordingly, an exemplary embodiment of the present invention may be adapted to any situation in which accurate scanning of mobile codes is desired.

The input module 302 and the display module 316 receive user input and display output to the user, respectively. The display module 316 may display a graphical user interface through which the user interacts with the mobile device 300. The display module 316 may be provided as a Liquid Crystal Display (LCD). In this case, the display module 316 may include a controller for controlling the LCD, a video memory in which image data is stored and an LCD element. If the LCD is provided as a touch screen, the display module 316 may perform a part or all of the functions of the input unit 302.

The mobile code scanning module 304 and the mobile code decoding module 308 scans and decodes a mobile code. The information contained in the mobile code is made available to the mobile device for various purposes. According to an exemplary embodiment of the present invention, the mobile device 300 may include a camera module (not shown) instead of, or in addition to, the mobile code scanning module 304. In this case, the camera module may capture an image of the mobile code, which is then processed and decoded by the mobile code decoding module 308.

The communication module 312 communicates with external devices, and may be a wired and/or wireless connection. The communication module 312 may, for example, include a Radio Frequency (RF) transmitter and receiver for wireless communication. The communication module 312 may support communication via a variety of protocols, including Bluetooth, Wi-Fi, cellular service (including 3G and 4G services), Ethernet, Universal Serial Bus (USB), and the like.

The storage module 314 stores information in the mobile device 300. The storage module may store, for example, user preference information, and the like. The storage module also stores partially decoded mobile codes for use by the sequence alignment processor 310.

The processor 306 controls overall operation of the mobile device 300. For example, the processor 306 may execute an application that employs the mobile code information decoded by the mobile code decoder 308. The application may use the information in the mobile code for a variety of purposes, including geotagging, social networking, commerce, mobile tickets, context-aware applications, and the like The sequence alignment processor 310 executes a sequence alignment algorithm using the stored partially decoded mobile codes. If the mobile code decoding module 308 is unable to decode a mobile code, the mobile code decoding module 308 notifies the sequence alignment processor 310 and stores the partially decoded mobile code in the storage module 314. Once a predetermined number of partially decoded mobile codes have been stored in the storage module 314, the sequence alignment processor 310 executes a sequence alignment algorithm based on the stored partially decoded mobile codes.

If a predetermined number of mobile codes have not yet been received, the sequence alignment processor 310 may wait to decode the mobile code until the predetermined number of mobile codes is received. In this case, the mobile device may output an error message indicating that the mobile code could not be decoded. Alternatively, the mobile device may request that the user re-scan the mobile code.

As discussed above, the sequence alignment algorithm may be any sequence alignment algorithm having sufficient speed and efficiency to operate using the limited processing power of the mobile device 300. Heuristic algorithms may be sufficient for this purpose, although additional algorithms may be developed which satisfy the requirements of the mobile device.

Based on the results of the algorithm, the sequence alignment processor 310 obtains a complete mobile code. The mobile code is then made available to the mobile device. As discussed above, the mobile codes can be used for a variety of purposes, including geotagging, social networking, commerce, mobile tickets, context-aware applications, and the like.

Figure 4:
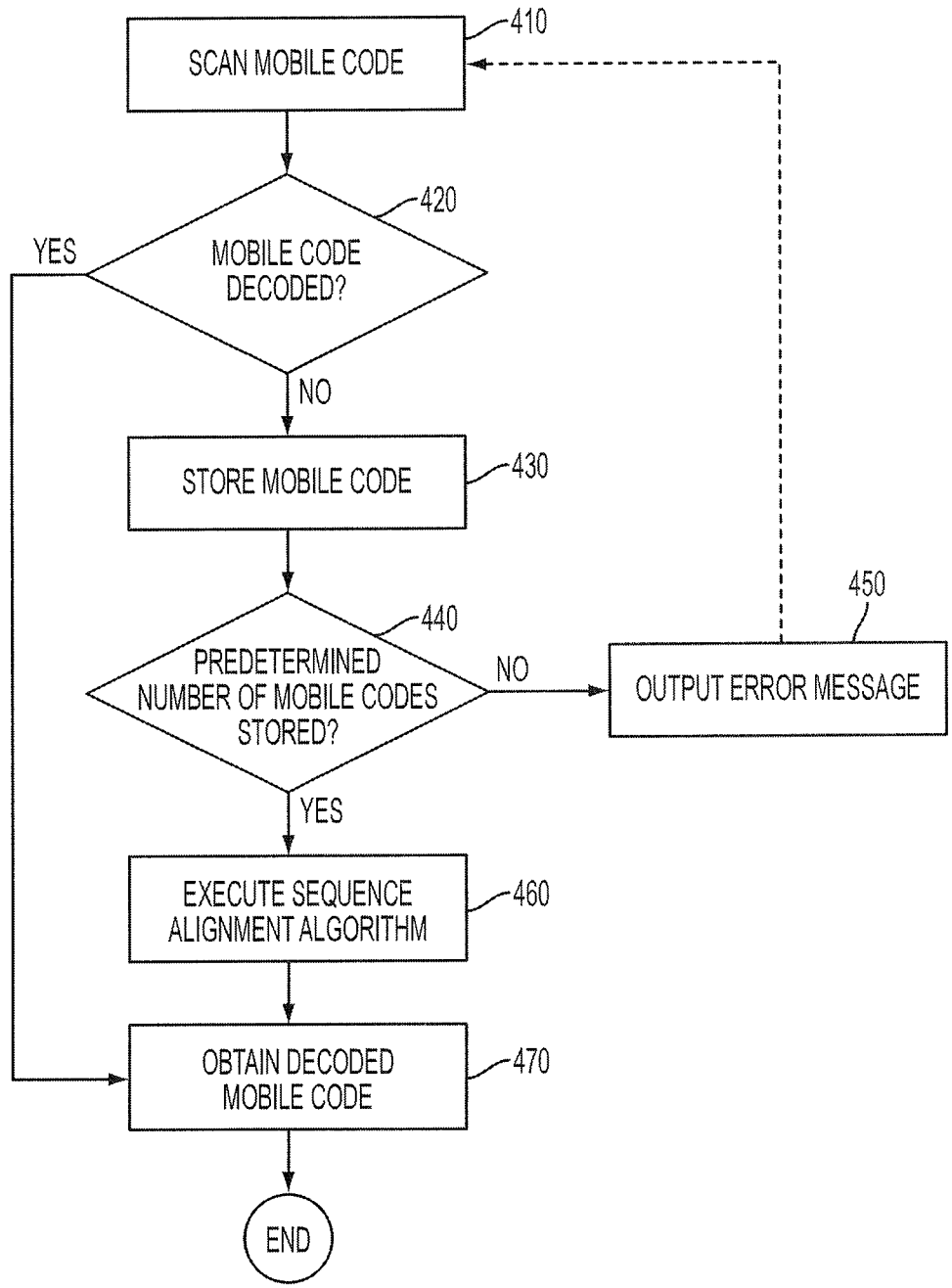
FIG. 4 illustrates a method of decoding a mobile code in a mobile device according to an exemplary embodiment of the present invention.

FIG. 4 illustrates a method of decoding a mobile code in a mobile device according to an exemplary embodiment of the present invention.

Referring to FIG. 4, a user scans a mobile code using the mobile device in step 410. The mobile device may employ a mobile code scanning module to scan the mobile code or a camera module to capture an image of the mobile code.

The mobile device attempts to decode the mobile code in step 420. If the attempt is successful, the decoded mobile code is obtained in step 470. If the attempt is not successful, the partially decoded mobile code is stored in the storage module 314 in step 430.

In step 440, the sequence alignment processor 310 determines whether a predetermined number of mobile codes are stored in the storage unit 314. The predetermined number may be a number determined to be the minimum number of partially decoded mobile codes needed to generate a complete mobile code according to a sequence alignment algorithm. The particular predetermined number may be determined experimentally and may be determined based on the particular algorithm or algorithms employed by the sequence alignment processor 310. However, the predetermined number should be at least 2.

If the predetermined number of mobile codes has not been stored, then the mobile terminal outputs an error message in step 450. The error message may indicate that the mobile code could not be read, and may request that the user try again. If the error message indicates that the user rescan the mobile code, operations return to step 410, as indicated by the dotted line. According to another exemplary embodiment of the present invention (not shown), the mobile terminal may automatically rescan the mobile code without outputting an error message or requesting that the user rescan the mobile code.

If the predetermined number of mobile codes has been stored, the sequence alignment processor 310 executes a sequence alignment algorithm in step 460. In step 470, the sequence alignment processor 310 obtains the decoded mobile code based on the optimal alignment generated by the sequence alignment algorithm.

In the field of bioinformatics, a resulting sequence extracted from the result of the sequence is referred to as a Consensus Sequence (CS), reflecting the consensus arrived through application of the MSA. The CS refers to the most common nucleotide or amino acid at a particular position after multiple sequences are aligned. A CS is a way of representing the results of a multiple sequence alignment, where related sequences are compared to each other. The CS shows which residues are most abundant in the alignment at each position. Similarly, with respect to mobile codes, the CS reflects the properly decoded mobile code.

Given a threshold, the CS represents each column of an alignment with the most frequently appearing character in that column. The frequency of the most frequently appearing character's percentage in the column should be greater than or equal to the given threshold. If the frequency of the most frequently appearing character in a given column is less than the threshold, the CS represents the column with a gap. After the consensus sequence in an alignment is obtained, if gap residues are present in the consensus sequence, additional analysis methods may be employed where possible. One such additional analysis method is a context-based method. For example, if the consensus sequence is "htt-://aa.com", the context suggests that the consensus sequence represents a web site. Knowledge of Internet formats such as Uniform Resource Locators (URLs) can then be applied to infer the missing character(s). In this case, the missing character is inferred to be "p", leading to a result of "http://aa.com".

Although not shown in FIG. 4, it is possible that the sequence alignment processor 310 will not obtain a successfully decoded mobile code. Such a case may occur when all of the partially decoded mobile codes have a gap at the same point, or when the partially decoded mobile codes have different values for the same element of the mobile code, and the sequence alignment processor cannot infer a correct value based on an additional analysis method. In this case, an error message may be output, and the user invited to rescan the mobile code.

According to an exemplary embodiment of the present invention, user experience with mobile codes can be improved because the sequence alignment algorithm permits the mobile device to decode mobile codes more efficiently. Instead of discarding a partially decoded mobile code, the mobile device stores these partially decoded mobile codes and utilizes this history to decode the mobile code more quickly. As a result, fault recovery is improved, leading to a better user experience with mobile codes.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for decoding a mobile code based on a sequence alignment algorithm, the method comprising:
   scanning a mobile code;
   decoding the mobile code;
   when the mobile code is not decoded successfully, storing a decoded portion of the mobile code as a partially decoded mobile code, and decoding the mobile code based on a sequence alignment algorithm and a predetermined number of partially decoded mobile codes; and
   providing the decoded mobile code to a mobile device,
   wherein the sequence alignment algorithm is selected according to capabilities of the mobile device.

2. The method according to claim 1, wherein the sequence alignment algorithm is a heuristic sequence alignment algorithm.

3. The method according to claim 1, wherein the capabilities of the mobile device include a processing power and storage capacity of the mobile device.

4. The method according to claim 1, wherein when the mobile code is not decoded successfully and the predetermined number of previously stored partially decoded mobile codes has not been stored, outputting an error message indicating that the mobile code could not be decoded.

5. The method according to claim 1, further comprising:
when the mobile code is not decoded successfully and the predetermined number of previously stored partially decoded mobile codes has not been stored, scanning the mobile code an additional time.

6. The method according to claim 1, wherein the mobile code is a barcode.

7. The method according to claim 1, wherein the decoding of the mobile code according to a sequence alignment algorithm comprises:
generating an optimal alignment of the partially decoded mobile code based on the sequence alignment algorithm and the predetermined number of partially decoded mobile codes; and
decoding the mobile code according to the generated optimal alignment.

8. A mobile device, comprising:
a mobile code scanner for scanning a mobile code;
a mobile code decoder for decoding the mobile code;
a storage unit for storing partially decoded mobile codes representing decoded portions of mobile codes that could not be fully decoded by the mobile code decoder; and
a sequence alignment processor for decoding the mobile code based on the stored partially decoded mobile codes and a sequence alignment algorithm when the mobile code decoder could not decode the mobile code,
wherein the sequence alignment algorithm is selected according to capabilities of the mobile device.

9. The mobile device of claim 8, wherein when the mobile code decoder cannot decode the mobile code, the mobile code decoder stores the mobile code in the storage unit as a partially decoded mobile code, and notifies the sequence alignment processor that the mobile code could not be decoded.

10. The mobile device of claim 8, wherein the sequence alignment algorithm decodes the mobile code based on a predetermined number of partially decoded mobile codes stored in the storage unit.

11. The mobile device of claim 8, wherein the sequence alignment algorithm is a heuristic sequence alignment algorithm.

12. The mobile device of claim 8, wherein the capability of the mobile device includes a processing power of the sequence alignment processor and a storage capacity of the storage unit.

13. The mobile device of claim 8, wherein the mobile code is a barcode.

14. The mobile device of claim 8, wherein the sequence alignment processor generates an optimal alignment of the partially decoded mobile code based on the sequence alignment algorithm and the predetermined number of partially decoded mobile codes; and decodes the mobile code according to the generated optimal alignment.

* * * * *